US012626712B2

(12) United States Patent
Mosayyebpour Kaskari et al.

(10) Patent No.: US 12,626,712 B2
(45) Date of Patent: May 12, 2026

(54) SPEECH ENHANCEMENT SYSTEM

(71) Applicant: Synaptics Incorporated, San Jose, CA (US)

(72) Inventors: Saeed Mosayyebpour Kaskari, Irvine, CA (US); Gandhi Namani, Irvine, CA (US)

(73) Assignee: Synaptics Incorporated, San Jose, CA (US)

( * ) Notice: Subject to any disclaimer, the term of this patent is extended or adjusted under 35 U.S.C. 154(b) by 138 days.

(21) Appl. No.: 18/303,524

(22) Filed: Apr. 19, 2023

(65) Prior Publication Data

US 2024/0355347 A1 Oct. 24, 2024

(51) Int. Cl.

*G10L 21/0216* (2013.01)
*G10L 21/0264* (2013.01)
*G10L 25/78* (2013.01)

(52) U.S. Cl.

CPC ...... *G10L 21/0216* (2013.01); *G10L 21/0264* (2013.01); *G10L 25/78* (2013.01)

(58) Field of Classification Search

CPC ............. G10L 21/0216; G10L 21/0264; G10L 25/78

See application file for complete search history.

(56) References Cited

U.S. PATENT DOCUMENTS 12,254,864 B1 * 3/2025 Lajszczak ............... G10L 15/22
2007/0136058 A1 * 6/2007 Jeong ...................... G10L 15/00 704/240
2012/0173234 A1 * 7/2012 Fujimoto ................ G10L 15/20 704/233
2013/0054234 A1 * 2/2013 Kim ........................ G10L 21/02 704/226

(Continued)

OTHER PUBLICATIONS

Araki et al., "Stereo Source Separation and Source Counting with MAP Estimation with Dirichlet prior Considering Spatial Aliasing Problem," In ICA 2009: Proceedings of the 8th International Conference on Independent Component Analysis and Signal Separation, pp. 742-750, Springer-Verlag, Berlin, Heidelberg (2009).

(Continued)

*Primary Examiner* — Richemond Dorvil
*Assistant Examiner* — Ethan Daniel Kim
(74) *Attorney, Agent, or Firm* — Paradice & Li LLP

(57) ABSTRACT

A method of suppressing noise may include receiving a sequence of audio frames representing a multi-channel audio signal. The method may include determining a likelihood of speech in a first audio frame of the sequence of audio frames based on a Gaussian mixture model. Further, the method may include generating a first audio signal based on the likelihood of speech in the first audio frame and a second audio signal representing a first speech component of a second audio frame. The second audio frame follows the first audio frame in the sequence of audio frames. The method may also include determining, using a neural network model, a likelihood of speech in the second audio frame based on the first audio signal, and filtering a noise component of the second audio frame based at least in part on the likelihood of speech in the second audio frame.

20 Claims, 4 Drawing Sheets

(56) References Cited

U.S. PATENT DOCUMENTS

| | | | | |
|---|---|---|---|---|
| 2014/0185827 | A1* | 7/2014 | Kitazawa | H04R 3/00 381/94.2 |
| 2016/0275964 | A1* | 9/2016 | Kim | G10L 21/0232 |
| 2017/0372725 | A1* | 12/2017 | Khoury | G10L 25/45 |
| 2019/0172476 | A1* | 6/2019 | Wung | G10L 21/0232 |

OTHER PUBLICATIONS

Brandstein et al., "Microphone Arrays," Signal Processing Techniques and Applications, Springer Verlag, pp. 1-7 accessed at https:/link.springer.com/book/10.1007/978-3-662-04619-7#toc, (2001), (Pages include Editors, Table of Contents, and Summary about book only).

Koldovsky et al., "Semi-blind Noise Extraction Using Partially Known Position of the Target Source," IEEE Transactions on Audio, Speech & Language Processing 21(10), pp. 2029-2041 (2013).

Nakatani et al., "Integrating DNN-Based and Spatial Clustering-Based Mask Estimation for Robust MVDR Beamforming," ICASSP, pp. 286-290, 2017.

Nesta et al., "On-line Multi-channel Estimation of Source Spectral Dominance," in International Conference on Latent Variable Analysis and Signal Separation, Springer, 2015, pp. 404-412.

Pedersen et al., "A Survey of Convolutive Blind source Separation Methods," in Springer Handbook of Speech Processing and Speech Communication, Nov. 2007, pp. 1-34.

Shen et al., "Voice Activity Detection Based on Sequential Gaussian Mixture Model with Maximum Likelihood Criterion", IEEE, International Symposium on Chinese Spoken Language Processing (ISCSLP), Oct. 2016, pp. 1-5.

Souden et al., "A Study of the LCMV and MVDR Noise Reduction Filters," IEEE Trans. Signal Process., vol. 58, No. 9, pp. 4925-4935, Sep. 2010.

Tashev et al., "Unified Framework for Single Channel Speech Enhancement," IEEE Pacific Rim Conference on Communications, Computers and Signal Processing (Aug. 2009), pp. 1-7.

* cited by examiner

SPEECH ENHANCEMENT SYSTEM

TECHNICAL FIELD

The present embodiments relate generally to signal processing, and specifically to signal processing techniques for speech enhancement.

BACKGROUND OF RELATED ART

A hands-free communication device may include a microphone array configured to convert sound waves into a multi-channel audio signal, which may be transmitted over a communications channel to a receiving device. The multi-channel audio signal may be represented in the time-frequency domain as a sequence of frames, and include speech (e.g., from a user of the communication device) and noise (e.g., from a reverberant enclosure). Before the multi-channel audio signal is transmitted to the receiving device, the communication device may employ a signal processing technique known as speech enhancement, which attempts to suppress the noise in the multi-channel audio signal while reducing or minimizing speech distortion.

Some communication devices may use a spatial filter (e.g., a beamformer) for speech enhancement. The spatial filter may utilize a Voice Activity Detector (also referred to as a "VAD") to determine the presence or absence of speech in each frame of the multi-channel audio signal. Some VADs may be implemented using machine learning (such as a neural network based on a neural network model). However, the accuracy of such VADs may suffer due to differences between data used to train and test the neural network model, or due to a high amount of noise in the audio signals input to the neural network. Some communication devices may also use a post-filter, such as a binary mask or Wiener-like gain, to suppress residual noise in the enhanced speech signal produced by the spatial filter. However, such post-filters do not explicitly model uncertainty in the spatial filter, and thus require a heuristic tuning hyperparameter optimized to avoid distorting the enhanced speech signal.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method of suppressing noise. The method may include receiving a sequence of audio frames representing a multi-channel audio signal. The method may further include determining a likelihood of speech in a first audio frame of the sequence of audio frames based on a Gaussian mixture model. The method may include generating a first audio signal based on the likelihood of speech in the first audio frame and a second audio signal representing a first speech component of a second audio frame. The second audio frame follows the first audio frame in the sequence of audio frames. The method may also include determining, using a neural network model, a likelihood of speech in the second audio frame based on the first audio signal. The method may include filtering a noise component of the second audio frame based at least in part on the likelihood of speech in the second audio frame.

Another innovative aspect of the subject matter of this disclosure can be implemented in a system including a processing system and a memory. The memory may store instructions that, when executed by the processing system, cause the system to receive a sequence of audio frames representing a multi-channel audio signal, and determine a likelihood of speech in a first audio frame of the sequence of audio frames based on a Gaussian mixture model. Execution of the instructions may further cause the system to generate a first audio signal based on the likelihood of speech in the first audio frame and a second audio signal representing a first speech component of a second audio frame. The second audio frame follows the first audio frame in the sequence of audio frames. Execution of the instructions may further cause the system to determine, using a neural network model, a likelihood of speech in the second audio frame based on the first audio signal, and filter a noise component of the second audio frame based at least in part on the likelihood of speech in the second audio frame.

BRIEF DESCRIPTION OF THE DRAWINGS

The present embodiments are illustrated by way of example and are not intended to be limited by the figures of the accompanying drawings.

DETAILED DESCRIPTION

Figure 1:
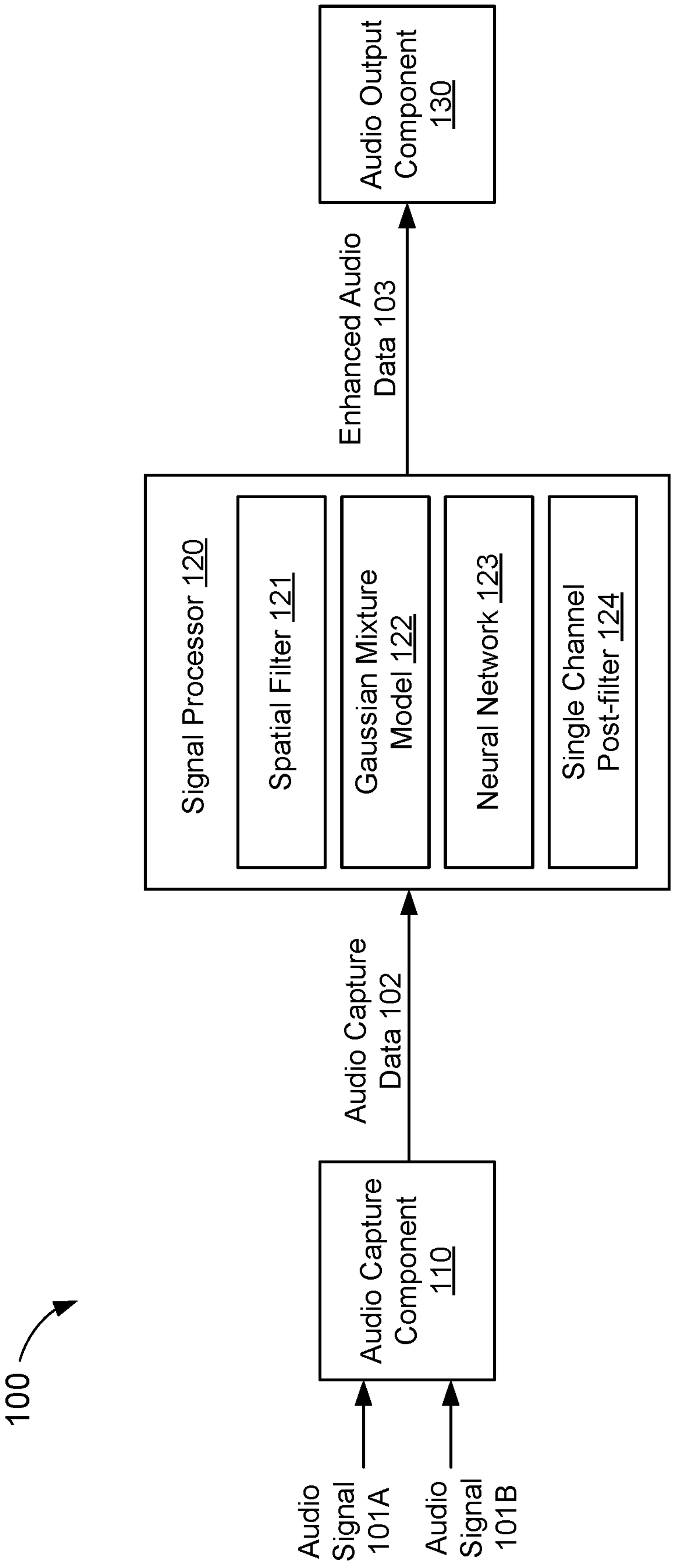
FIG. 1 shows a block diagram of an example audio processing system, according to some embodiments.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, perform one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

Aspects of the disclosure provide systems and techniques for enhancing speech in a multi-channel audio signal. In some embodiments, a speech enhancement system may receive a sequence of audio frames representing a multi-channel audio signal that includes speech and noise. In some aspects, the multi-channel audio signal may be captured by, for example, a microphone array. In some embodiments, the speech enhancement system may include a spatial filter, a Gaussian mixture model (also referred to as a "GMM"), a neural network, and a post-filter.

The speech enhancement system may determine a likelihood of speech in a first audio frame of the sequence of audio frames (e.g., $p_{GMM}(l, f)$) using the GMM (e.g., an online GMM). In some embodiments, the speech enhancement system may generate an enhanced audio signal (e.g., $z_{NN}(l+1,f)$) based on (i) the likelihood of speech in the first audio frame (e.g., $p_{GMM}(l, f)$) and (ii) an initial speech signal that represents a first speech component of a second audio frame (e.g., $\tilde{s}_0(l+1, f)$). The second audio frame follows the first audio frame in the sequence of audio frames. In some embodiments, the speech enhancement system may further determine, using the neural network (e.g., a deep neural network ("DNN")), a likelihood of speech in the second audio frame (e.g., $p_{NN}(l+1, f)$) based on the enhanced audio signal (e.g., $z_{NN}(l+1, f)$). The speech enhancement system may also determine a VAD value (e.g., $VAD_{NN}(l+1)$) based on an output of the neural network, where the VAD value indicates whether speech is present or absent in the second audio frame. In some embodiments, the speech enhancement system may determine the VAD value (e.g., $VAD_{NN}(l+1)$) based on the initial speech signal (e.g., $\tilde{s}_0(l+1, f)$) and the likelihood of speech in the second audio frame (e.g., $p_{NN}(l+1,f)$). In some implementations, the speech enhancement system may update one or more parameters of the GMM based on the VAD value associated with the second audio frame (e.g., $VAD_{NN}(l+1)$).

In some embodiments, the speech enhancement system may determine a speech signal that represents a second speech component of the second audio frame (e.g., $\tilde{s}(l+1, f)$) based at least in part on the likelihood of speech in the second audio frame (e.g., $p_{NN}(l+1, f)$). The speech enhancement system may also estimate a noise component of the second audio frame (e.g., $n(l+1, f)$) based at least in part on the speech signal (e.g., $\tilde{s}(l+1, f)$). Further, in some embodiments, the speech enhancement system may determine, using the GMM, a likelihood of speech in the second audio frame (e.g., $p_{GMM}(l+1, f)$). The speech enhancement system may further include a single channel post-filter configured to determine an enhanced speech signal (e.g., $\hat{s}(l+1, f)$) based at least in part on the speech signal (e.g., $\tilde{s}(l+1, f)$) and the likelihood of speech in the second audio frame determined using the GMM (e.g., $p_{GMM}(l+1, f)$). The enhanced speech signal (e.g., (l+1, f)) may include less noise than the speech signal (e.g., $\tilde{s}(l+1, f)$) and the initial speech signal (e.g., $\tilde{s}_0(l+1, f)$).

Aspects of the present disclosure may improve the accuracy of neural network-based VADs by using the output of the GMM to supervise the neural network. Moreover, because the initial speech signal derived from the second audio frame (e.g., $\tilde{s}_0(l+1, f)$) is further filtered using the likelihood of speech in the first audio frame (e.g., $p_{GMM}(l, f)$) to produce the enhanced audio signal (e.g., $z_{NN}(l+1, f)$), the enhanced audio signal may include less noise than the initial speech signal. Consequently, the enhanced audio signal (e.g., $z_{NN}(l+1,f)$) may help the neural network (or DNN) provide more accurate and reliable inferencing results, particularly when the multi-channel audio signal includes highly non-stationary audio signals (e.g., concurrent speech sounds) or has a negative signal-to-noise ratio (SNR).

Moreover, while existing post-filtering techniques for speech enhancement require a heuristic tuning hyperparameter optimized to avoid distorting speech in an audio signal, the single channel post-filter of present embodiments avoids the need for this hyperparameter by receiving outputs (or supervision) from, for example, the GMM and neural network. This supervision helps the single channel post-filter reduce the likelihood of distorting speech in a multi-channel audio signal that was captured by microphones (or other acoustic sensors) in highly noisy conditions.

FIG. 1 shows a block diagram of an example audio processing system 100 that includes an audio capture component 110, a signal processor 120, and an audio output component 130. The audio capture component 110 (e.g., a microphone array or other acoustic sensors) captures (or records) multiple audio signals, such as audio signals 101A and 101B. Each of the audio signals 101A and 101B may be captured by a respective microphone of a microphone array, and include speech from a speech source and noise from a noise source. Further, each of the respective microphones used to capture the audio signals 101A and 101B may be located at a unique (or different) position in the microphone array (or physical space). In some embodiments, the microphone used to capture the audio signal 101A may be positioned closer to the speech source than the noise source (and also be referred to as a "reference microphone"), and the microphone used to capture the audio signal 101B may be positioned closer to the noise source than the speech source. The audio capture component 110 may convert the captured audio signals 101A and 101B into digital audio capture data 102 (also referred to as a "multi-channel audio signal 102"), which may represent a sequence of frames.

In some embodiments, the signal processor 120 may filter the digital audio capture data 102 to produce enhanced audio data 103. More specifically, the signal processor 120 may produce the enhanced audio signal 103 by filtering or suppressing noise in the multi-channel audio signal 102. In some embodiments, the signal processor 120 may include a spatial filter 121, a GMM 122, a neural network 123, and a single channel post-filter 124. In some embodiments, the spatial filter 121 may filter the multi-channel audio signal 102 by suppressing noise in the multi-channel audio signal 102. For example, the spatial filter 121 may perform beamforming or independent component analysis (ICA) to reduce noise in the multi-channel audio signal 102.

In some embodiments, the GMM 122 (e.g., an online GMM) may model uncertainty in the multi-channel audio signal 102 filtered by the spatial filter 121 (also referred to as the "filtered multi-channel audio signal 102"). That is, the GMM 122 may determine a likelihood of speech in the filtered multi-channel audio signal 102.

For example, after the spatial filter filters a given frame of the multi channel audio signal 102 (or produces a given frame of the filtered multi-channel audio signal 102), the GMM 122 may determine a likelihood of speech for the given frame in the filtered multi-channel audio signal 102. In some embodiments, the spatial filter may also filter a subsequent frame of the multi-channel audio signal 102. Further, the neural network 123 (e.g., a DNN) may determine a likelihood of speech in the filtered subsequent frame of the multi-channel audio signal 102 using (i) the likelihood of speech for the given frame in the filtered multi-channel audio signal 102 and (ii) the filtered subsequent frame of the multi-channel audio signal 102.

In some aspects, the neural network 123 may be trained through machine learning. Machine learning, which generally includes a training phase and an inferencing phase, is a technique for improving the ability of a computer system or application to perform a certain task. During the training phase, a machine learning system is provided with one or more "answers" and a large volume of raw training data associated with the answers. The machine learning system analyzes the training data to learn a set of rules that can be used to describe each of the one or more answers. During the inferencing phase, the machine learning system may infer answers from new data using the learned set of rules.

Deep learning is a particular form of machine learning in which the inferencing (and training) phases are performed over multiple layers, producing a more abstract dataset in each successive layer. Deep learning architectures are often referred to as "artificial neural networks" due to the manner in which information is processed (similar to a biological nervous system). For example, each layer of an artificial neural network may be composed of one or more "neurons." The neurons may be interconnected across the various layers so that the input data can be processed and passed from one layer to another. More specifically, each layer of neurons may perform a different transformation on the output data from a preceding layer so that one or more final outputs of the neural network result in one or more desired inferences. The set of transformations associated with the various layers of the network is referred to as a "neural network model."

In some embodiments, the single channel post-filter 124 (e.g., a Wiener filter) may suppress any residual noise in the filtered multi-channel audio signal 102. Put differently, the single channel post-filter may produce enhanced audio data 103 based at least in part on the filtered multi-channel audio signal 102 and the likelihood of speech in the filtered multi-channel audio signal 102 calculated by the GMM 122. In some aspects, the enhanced audio data 103 may include enhanced speech (or less noise) relative to the multi-channel audio signal 102. Further, in some embodiments, the audio output component 130 (e.g., a headset, a smartphone, or IoT device) may receive the enhanced audio data 103, and play the enhanced audio data 103 using one or more speakers.

Figure 2:
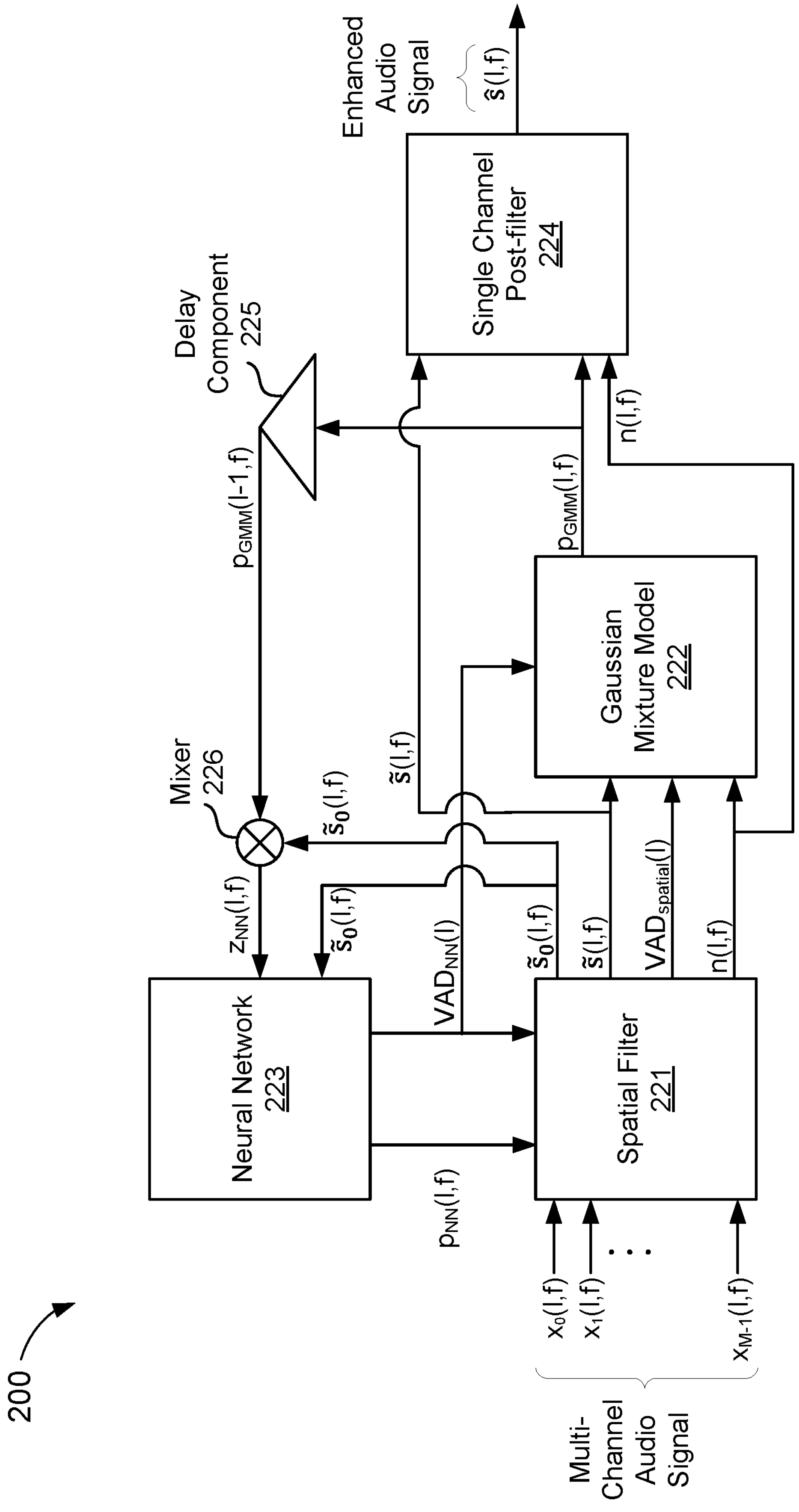
FIG. 2 shows a block diagram of an example speech enhancement system, according to some embodiments.

FIG. 2 shows a block diagram of an example speech enhancement system 200, according to some embodiments. The speech enhancement system 200 includes a spatial filter 221, a GMM 222, a neural network 223, a single channel post-filter 224, a delay component 225, and a mixer 226. In some aspects, the speech enhancement system 200 may be one example of the signal processor 120 of FIG. 1. Thus, the speech enhancement system may filter or suppress a noise component of a multi-channel audio signal, $x_0(l,f)-x_{M-1}(l,f)$, representing a number (M) of audio channels (or microphones), to produce a corresponding enhanced audio signal $\hat{s}(l, f)$. The multi-channel audio signal $x_0(l, f)-x_{M-1}(l, f)$ and the enhanced audio signal $\hat{s}(l, f)$ may be examples of the digital audio capture data 102 and the enhanced audio data 103, respectively, of FIG. 1.

As shown in FIG. 2, in some embodiments, the spatial filter 221 may be configured to receive the multi-channel audio signal $x_0(l, f)-x_{M-1}(l, f)$. Each audio signal of the multi-channel audio signal $x_0(l,f)-x_{M-1}(l,f)$ may be expressed in the time-frequency domain as $x(l, f)$, where l is a frame index and f is a frequency index. Further, each audio signal $x(l, f)$ of the multi-channel audio signal $x_0(l, f)-$ $x_{M-1}(l, f)$ may be represented by a sequence of audio frames (e.g., $x(l-1, f)$, $x(l, f)$, $x(l+1, f)$, $x(l+2, f)$ . . . ). In some aspects, the audio signal $x(l, f)$ represents an audio signal captured subsequent to the audio signal $x(l-1, f)$, and the audio signal $x(l+1, f)$ represents an audio signal captured subsequent to the audio signal $x(l, f)$, and so forth. Further, each audio signal $x(l, f)$ of the multi-channel audio signal $x_0(l, f)$–$x_{M-1}(l, f)$ may include speech from a speech source and noise from a noise source.

In some embodiments, the spatial filter 221 (e.g., a beamformer or ICA) may measure (or estimate) a spatial covariance of speech ($\phi_{SS}(l, f)$) associated with the multi-channel audio signal $x_0(l, f)$–$x_{M-1}(l, f)$, recursively, as follows:

$$\phi_{SS}(l, f) = (1 - p_{NN}(l, f))\phi_{SS}(l-1, f) + p_{NN}(l, f)\left(x_{MC}(l, f)x_{MC}^H(l, f)\right) \quad \text{(Equation 1)}$$

In Equation 1, the spatial covariance of speech $\phi_{SS}(l, f)$ represents a matrix with dimensions of M×M, where M represents the total number of microphones used to capture the multi-channel audio signal $x_0(l,f)$–$x_{M-1}(l,f)$, as explained above. The frequency index f may range from 0 to K−1, where K represents the total number of frequency bins. $x_{MC}(l, f)$ is a vector that represents the multi-channel audio signal $x_0(l, f)$–$x_{M-1}(l, f)$, and $$x_{MC}^H(l, f)$$

is a vector that represents the Hermitian transpose of $x_{MC}(l,f)$. $p_{NN}(l,f)$ represents a likelihood of speech received by the spatial filter 221 from the neural network 223.

The spatial filter 221 may measure (or estimate) a spatial covariance of noise ($\phi_{NN}(l, f)$) associated with the multi-channel audio signal $x_0(l, f)$–$x_{M-1}(l, f)$, recursively, as follows:

$$\phi_{NN}(l, f) = p_{NN}(l, f)\phi_{NN}(l-1, f) + (1 - p_{NN}(l, f))\left(x_{MC}(l, f)x_{MC}^H(l, f)\right) \quad \text{(Equation 2)}$$

In Equation 2, the spatial covariance of noise $\phi_{NN}(l, f)$ represents a matrix with dimensions of M×M.

In some embodiments, the spatial filter 221 may be, for example, a minimum variance distortionless response (MVDR) beamformer that may determine a parameter $W(l, f)$, as follows:

$$W(l, f) = \phi_{NN}^{-1}(l, f)\phi_{SS}(l, f) \quad \text{(Equation 3)}$$

The MVDR beamformer may calculate a "beamforming filter" $w_{MVDR}(l, f)$ based on the parameter $W(l, f)$ of Equation 3, as follows:

$$w_{MVDR}(l, f) = \frac{W(l, f)}{\text{trace}(W(l, f)).}u \quad \text{(Equation 4)}$$

In Equation 4, the beamforming filter $w_{MVDR}(l, f)$ represents a matrix of weights with a single dimension of M. u represents a one-hot vector of a reference microphone channel. In some aspects, the reference microphone channel is an audio signal of the multi-channel audio signal $x_0(l, f)$–$x_{M-1}(l, f)$ that was captured by a reference microphone (e.g., a microphone positioned closer to the speech source than the noise source). It is noted that when the spatial filter 221 is a filter other than an MVDR beamformer, the spatial filter 221 may apply a different parameter than the beamforming filter $w_{MVDR}(l, f)$ for filtering.

In some embodiments, the MVDR beamformer may apply the beamforming filter $w_{MVDR}(l-1, f)$ to the multi-channel audio signal $x_{MC}(l,f)$ to produce an initial speech signal $\tilde{s}_0(l, f)$, as follows:

$$\tilde{s}_0(l, f) = w_{MVDR}^H(l-1, f)x_{MC}(l, f) \quad \text{(Equation 5.1)}$$

In Equation 5.1, the initial speech signal $\tilde{s}_0(l, f)$ may represent a first speech component of a frame l of the multi-channel audio signal $x_{MC}(l, f)$.

$$w_{MVDR}^H$$

represents the Hermitian transpose of the beamforming filter $w_{MVDR}(l-1, f)$. In some aspects, the mixer 226 may receive and use the initial speech signal $\tilde{s}_0(l, f)$ to determine an enhanced speech signal (e.g., $z_{NN}(l, f)$), and the neural network 223 may receive and use the enhanced speech signal (e.g., $z_{NN}(l, f)$) to determine a likelihood of speech (e.g. $p_{NN}(l, f)$).

In some embodiments, the MVDR beamformer may apply the beamforming filter $w_{MVDR}(l, f)$ to the multi-channel audio signal $x_{MC}(l, f)$ to produce a speech signal $\tilde{s}(l, f)$, as follows:

$$\tilde{s}(l, f) = w_{MVDR}^H(l, f)x_{MC}(l, f) \quad \text{(Equation 5.2)}$$

In Equation 5.2, the speech signal $\tilde{s}(l, f)$ may represent a second speech component of the frame l of the multi-channel audio signal $x_{MC}(l, f)$.

$$w_{MVDR}^H$$

represents the Hermitian transpose of the beamforming filter $w_{MVDR}(l, f)$. In some aspects, subsequent to determining the initial speech signal $\tilde{s}_0(l,f)$ using Equation 5.1, the MVDR beamformer may determine the speech signal $\tilde{s}(l,f)$ using Equation 5.2.

The MVDR beamformer may also produce a noise signal ($n(l, f)$) based on the speech signal $\tilde{s}(l,f)$ of Equation 5.2 and the reference microphone channel (e.g., $x_1(l, f)$), as follows:

$$n(l, f) = x_1(l, f) - \tilde{s}(l, f) \quad \text{(Equation 6)}$$

In Equation 6, the noise signal $n(l, f)$ may represent a noise component of the multi-channel audio signal $x_0(l, f)$–$x_{M-1}(l, f)$.

In some embodiments, the GMM 222 may receive the speech signal $\tilde{s}(l,f)$ and the noise signal $n(l, f)$ from the spatial filter 221, and determine a normalized difference between the speech signal $\tilde{s}(l, f)$ and the noise signal $n(l, f)$, as follows:

$$e(l, f) = \frac{\tilde{s}(l, f) - n(l, f)}{\tilde{s}(l, f) + n(l, f)} \quad \text{(Equation 7)}$$

In Equation 7, the normalized difference $e(l, f)$ may be closer to +1 when the speech signal $\tilde{s}(l, f)$ includes mostly speech, and closer to −1 when the speech signal $\tilde{s}(l, f)$ includes mostly noise.

In some embodiments, the GMM 222 may determine a likelihood (or probability) of speech ($p_{GMM}(l, f)$) based on the normalized difference $e(l, f)$. For example, the GMM 222 may create a bimodal model with two Gaussian probability density functions (PDFs): (i) a Gaussian PDF for which speech is dominant and (ii) a Gaussian PDF for which noise is dominant. In some embodiments, the GMM 222 may calculate a weight ($w_c$), mean ($\mu_c$), and variance ($\sigma_c$) for each Gaussian PDF, as follows:

$$w_c(l, f) = (1 - \eta_c)w_c(l-1, f) + \eta_c p_c[c|e(l, f), \lambda(l-1, f)] \quad \text{(Equation 8)}$$

$$\mu_c(l, f) = \frac{(1 - \eta_c)\mu_c(l-1, f) + \eta_c p_c[c|e(l, f), \lambda(l-1, f)]e(l, f)}{w_c(l, f)} \quad \text{(Equation 9)}$$

$$\sigma_c(l, f) = \frac{(1 - \eta_c)\sigma_c(l-1, f) + \eta_c p_c[c|e(l, f), \lambda(l-1, f)](e(l, f) - \mu_c(l, f))^2}{w_c(l, f)} \quad \text{(Equation 10)}$$

In Equations 8-10, c may be set to a value of 1 or 2, where c=1 represents the Gaussian PDF for which speech is dominant, and c=2 represents the Gaussian PDF for which noise is dominant. Further, $\lambda(l-1, f)=\{w_1(l-1, f), t(l-1, f), \sigma_1(l-1, f), w_2(l-1, f), \mu_2(l-1, f), \sigma_2(l-1,f)\}$. $\eta_c$ represents an adaptive learning rate step-size.

In some embodiments, the GMM 222 may determine a probability $p[e(l, f)|c, \lambda(l, f)]$ based on the weight $w_c$, mean $\mu_c$, and variance $\sigma_c$ of Equations 8-10, as follows:

$$p[e(l, f)|c, \lambda(l, f)] = \frac{1}{\sigma_c(l, f)\sqrt{2\pi}} e^{-\frac{1}{2}\left(\frac{e(l,f)-\mu_c(l,f)}{\sigma_c(l,f)}\right)^2} \quad \text{(Equation 11)}$$

The GMM 222 may also determine a probability $p_c[c|e(l, f), \lambda(l, f)]$ based on the probability $p[e(l, f)|c, \lambda(l,f)]$ of Equation 11, as follows:

$$p_c[c|e(l, f), \lambda(l, f)] = \frac{w_c(l, f)p[e(l, f)|c, \lambda(l, f)]}{\sum_{c=1}^{2} w_c(l, f)p[e(l, f)|c, \lambda(l, f)]} \quad \text{(Equation 12.1)}$$

In some embodiments, the GMM 222 may determine a likelihood (or probability) of speech $p_{GMM}(l, f)$ based on the probability $p_c[c|e(l, f), \lambda(l, f)]$ of Equation 12.1, where c=1, as follows:

$$p_{GMM}(l, f) = p_{c=1}[c = 1|e(l, f), \lambda(l, f)] \quad \text{(Equation 12.2)}$$

In Equations 11-12.2, $\lambda(l, f)=\{w_1(l,f), \mu_1(l, f), \sigma_1(l,f), w_2(l, f), \mu_2(l, f), \sigma_2(l, f)\}$. In some embodiments, during operation, the GMM 222 may determine a likelihood of speech $p_{GMM}(l, f)$ in the speech signal $\tilde{s}(l, f)$ based on the noise signal $n(l,f)$, a VAD value (e.g., $VAD_{spatial}(l)$) received from the spatial filter 221, and a VAD value (e.g., $VAD_{NN}(l)$) received from the neural network 223. Further, the delay component 225 and/or the single channel post-filter 224 may receive the likelihood of speech $p_{GMM}(l, f)$ from the GMM 222. It is noted that the likelihood of speech $p_{GMM}(l, f)$ in the speech signal $\tilde{s}(l,f)$ may also be referred to as (or represent) a likelihood of speech $p_{GMM}(l, f)$ in (or derived from) the multi-channel audio signal $x_0(l, f)$–$x_{M-1}(l, f)$.

In some embodiments, the spatial filter 221 may determine, for a frame l+1 of the multi-channel audio signal (e.g., $x_0(l+1, f)$–$x_{M-1}(l+1, f)$), an initial speech signal $\tilde{s}_0(l+1, f)$ associated with the multi-channel audio signal $x_0(l+1, f)$–$x_{M-1}(l+1, f)$ using Equation 5.1.

In some embodiments, the mixer 226 may receive the initial speech signal $\tilde{s}_0(l+1, f)$ from the spatial filter 221, and the likelihood of speech $p_{GMM}(l, f)$ from the delay component 225. The mixer 226 may further apply the likelihood of speech $p_{GMM}(l, f)$ to the initial speech signal $\tilde{s}_0(l+1, f)$ to produce an enhanced speech signal $z_{NN}(l+1, f)$, which is shown in FIG. 2 using a different pair of sequential frames of the multi-channel audio signal. That is, FIG. 2 shows that the mixer 226 may apply a likelihood of speech $p_{GMM}(l-1,f)$ to an initial speech signal $\tilde{s}_0(l,f)$ to produce an enhanced speech signal $z_{NN}(l, f)$.

In some embodiments, the neural network 223 (e.g., a DNN) may determine a likelihood of speech $p_{NN}(l+1, f)$ in the initial speech signal $\tilde{s}_0(l+1, f)$, which is shown in FIG. 2 using a different frame of the multi-channel audio signal. That is, FIG. 2 shows that the neural network 223 may determine a likelihood of speech $p_{NN}(l, f)$ in the initial speech signal $\tilde{s}_0(l,f)$. It is noted that a likelihood of speech $p_{NN}(l, f)$ in the initial speech signal $\tilde{s}_0(l,f)$ may also be referred to as (or represent) a likelihood of speech $p_{NN}(l, f)$ in (or derived from) the multi-channel audio signal $x_0(l, f)$–$x_{M-1}(l, f)$. In some aspects, the neural network 223 may be based on a neural network model (e.g., a DNN model). Further, in some aspects, the spatial filter 221 may receive a likelihood of speech $p_{NN}(l, f)$ from the neural network 223.

Further, in some embodiments, the neural network 223 may utilize a VAD to determine a VAD value ($VAD_{NN}(l)$) based on a likelihood of speech $p_{NN}(l,f)$ and an initial speech signal $\tilde{s}_0(l,f)$ as follows:

$$VAD_{NN}(l) = \frac{\sum_{f=f_{min}}^{f_{max}} \tilde{s}_0(l, f)p_{NN}(l, f)}{\sum_{f=f_{min}}^{f_{max}} \tilde{s}_0(l, f)} \quad \text{(Equation 13)}$$

In Equation 13, $VAD_{NN}(l)$ may be a binary value indicating a presence or absence of speech in a given frame processed by the neural network 223. $f_{min}$ and $f_{max}$ represent minimum and maximum frequencies, respectively, that define a frequency range in which speech may be dominant (e.g., 0 Hz to 2000 Hz). Because the neural network 223 receives an enhanced speech signal $z_{NN}(l, f)$ as an input, the neural network 223 may determine a more accurate and reliable likelihood of speech $p_{NN}(l,f)$ and $VAD_{NN}(l)$, compared to existing speech enhancement techniques, particularly when the multi-channel audio signal $x_0(l, f)$–$x_{M-1}(l, f)$ is captured by microphones in highly non-stationary noisy conditions, with negative SNR. In some embodiments, the spatial filter 221, the GMM 222, and/or the single channel post-filter 224 may receive $VAD_{NN}(l)$ from the neural network 223.

In some embodiments, the spatial filter 221 may use a likelihood of speech $p_{NN}$ (l, f) from the neural network 223 to determine (for the frame l of the multi channel audio signal $x_0(l,f)$–$x_{M-1}(l,f)$), a respective (or corresponding) speech signal $\tilde{s}(l, f)$ and a respective (or corresponding) noise signal n(l, f) (per Equations 1-4, 5.2, and 6, for example).

Further, in some embodiments, the spatial filter 221 may determine a parameter r(l) based on the speech signal $\tilde{s}(l,f)$ and the noise signal n(l, f), as follows:

$$r(l) = \frac{\sum_{f=f_{min}}^{f_{max}} \tilde{s}(l, f)}{\sum_{f=f_{min}}^{f_{max}} n(l, f)} \quad \text{(Equation 14)}$$

In some embodiments, the frame l in Equation 14 may be substituted with one of the following frames of the multi-channel audio signal $x_0(l, f)$–$x_{M-1}(l,f)$: l–1, . . . , l–D–1, where D represents a number of frames, and a time window such as 200 ms.

The spatial filter 221 may determine a VAD value ($VAD_{spatial}(l)$) based on the parameter r(l) and the $VAD_{NN}$ (l), as follows in Equation 15:

$$VAD_{spatial}(l) = \begin{cases} 1 & \text{if } r(t) > c_1 VAD_{NN}(t) > c_2 \text{ for at least one } t \in \{l, \quad l-1, \ldots, l-D-1\} \\ 0 & \text{otherwise} \end{cases}$$

In Equation 15, $VAD_{spatial}(l)$ may be a binary value indicating a presence or absence of speech in a given frame processed by the spatial filter 221. $c_1$ and $c_2$ represent arbitrary, tunable parameters. In some embodiments, the GMM 222 may receive $VAD_{spatial}(l)$ from the spatial filter 221.

In some embodiments, the spatial filter 221 may determine the parameter r(l) based on the speech signal $\tilde{s}(l,f)$ and the noise signal n(l, f), per Equation 14. The spatial filter 221 may also determine $VAD_{spatial}(l)$ based on the parameter r(l) and the $VAD_{NN}(l)$, per Equation 15.

Further, the GMM 222 may receive the $VAD_{spatial}(l)$ from the spatial filter 221 and the $VAD_{NN}(l)$ from the neural network 223. The GMM 222 may also receive the speech signal $\tilde{s}(l, f)$ and the noise signal n(l, f) from the spatial filter 221. In some embodiments, the GMM 222 may update (or determine) the normalized difference e(l, f) based on the speech signal $\tilde{s}(l,f)$ and the noise signal n(l, f), per Equation 7. Further, the GMM 222 may update (or determine) the adaptive learning rate step size $\eta_c$ (a parameter in Equations 8-10, for which c=1 or 2) based on the $VAD_{spatial}(l)$ and the $VAD_{NN}(l)$. When $VAD_{spatial}(l)$=1, the GMM 222 may determine the adaptive learning rate step size $\eta_{c=1}$ (which corresponds to the Gaussian PDF for which speech is dominant), as follows:

$$\eta_{c=1} = \eta VAD_{NN}(l) \quad \text{(Equation 16)}$$

In Equation 16, η is a tunable hyperparameter that represents a maximum learning rate step-size that may be used for sub-band parameter tracking.

However, when the $VAD_{spatial}(l)$=0, the GMM 222 may determine the adaptive learning rate step size $\eta_{c=2}$ (which corresponds to the Gaussian PDF for which noise is dominant), as follows:

$$\eta_{c=2} = \eta(1 - VAD_{NN}(l)) \quad \text{(Equation 17)}$$

In some embodiments, once the GMM 222 determines the normalized difference e(l, f) and the adaptive learning rate step size $\eta_c$ based on the speech signal $\tilde{s}(l, f)$, the noise signal n(l, f), the $VAD_{spatial}(l)$, and the $VAD_{NN}(l)$, the GMM 222 may proceed to update (or determine) the weight ($w_c$), mean ($\mu_c$), and variance ($\sigma_c$) of the GMM 222 using Equations 8-10. The GMM 222 may then determine a likelihood of speech $p_{GMM}(l, f)$ using Equations 11-12.2. Because the GMM 222 receives not only the speech signal $\tilde{s}(l,f)$ and the noise signal n(l, f), but also the VAD values, $VAD_{spatial}(l)$ and $VAD_{NN}(l)$ (which are each a form of supervision), the GMM 222 may more accurately and reliably determine $p_{GMM}(l,f)$, where the multi-channel audio signal $x_0(l,f)$–$x_{M-1}(l,f)$ is captured by microphones in non-stationary noisy conditions.

In some embodiments, the single channel post-filter 224 (e.g., a Wiener filter) may be configured to receive the likelihood of speech $p_{GMM}(l, f)$ from the GMM 222. The single channel post-filter 224 may also be configured to receive the speech signal $\tilde{s}(l, f)$, and the noise signal n(l, f), from the spatial filter 221. In addition, the single channel post-filter 224 may receive the $VAD_{spatial}(l)$ from the GMM 222 (not shown in FIG. 2). Further, in some embodiments, in addition to or in lieu of the $VAD_{spatial}(l)$, the single-channel post-filter 224 may receive the $VAD_{NN}(l)$ from the neural network 223 or the GMM 222 (not shown in FIG. 2).

In some embodiments, the single channel post-filter 224 may determine a parameter a(l, f) based on the likelihood of speech $p_{GMM}(l, f)$ and the $VAD_{spatial}(l)$, as follows:

$$a(l, f) = \begin{cases} p_{GMM}(l, f) & \text{if } VAD_{spatial}(l) = 0 \\ 1 & \text{otherwise} \end{cases} \quad \text{(Equation 18)}$$

In some embodiments, the single channel post-filter 224 may determine a noise power $P_n(l, f)$ based on the parameter a(l, f), recursively, as follows:

$$P_n(l, f) = a(l, f)P_n(l-1, f) + (1 - a(l, f))|n(l, f)|^2 \quad \text{(Equation 19)}$$

Further, in some embodiments, the single channel post-filter 224 may determine a corresponding enhanced audio signal $\hat{s}(l, f)$ based on the noise power $P_n(l, f)$ and the speech signal $\tilde{s}(l, f)$, using spectral subtraction. For example, in some embodiments, the single channel post-filter 224 may determine a parameter a(l, f) based on the likelihood of speech $p_{GMM}(l, f)$ and the $VAD_{spatial}(l)$, per Equation 18. The single channel post-filter 224 may also determine a noise power $P_n(l, f)$ based on the parameter a(l, f), per Equation 19. Further, the single channel post-filter 224 may determine a corresponding enhanced audio signal $\hat{s}(l, f)$ based on the noise power $P_n(l, f)$ and the speech signal $\tilde{s}(l, f)$, using spectral subtraction. The enhanced audio signal $\hat{s}(l, f)$ may include enhanced speech (or reduced noise) relative to the multi channel audio signal $x_0(l, f)$–$x_{M-1}(l, f)$ received by the spatial filter 221. In some aspects, the single channel post-filter 224 may determine enhanced audio signals such as $\hat{s}(l-1, f)$, $\hat{s}(l+1, f)$, $\hat{s}(l+2, f)$, and so forth, of the multi-channel audio signal $x_0(l, f)$–$x_{M-1}(l, f)$, in a manner similar to that described above for the enhanced audio signal $\hat{s}(l, f)$.

Relative to conventional speech enhancement techniques, because the single channel post-filter 224 receives not only the speech signal $\tilde{s}(l, f)$ and the noise signal n(l, f)—but also supervision including (i) the $VAD_{spatial}(l, f)$ and/or the $VAD_{NN}(l)$ and (ii) the likelihood of speech $p_{GMM}(l, f)$—the single channel post-filter 224 may provide a more robust output. That is, the single channel post-filter 224 may output an enhanced audio signal $\hat{s}(l, f)$ that is less likely to include distorted speech, especially when the multi-channel audio signal $x_0(l,f)$–$x_{M-1}(l,f)$ is captured by microphones in highly noisy conditions.

Figure 3:
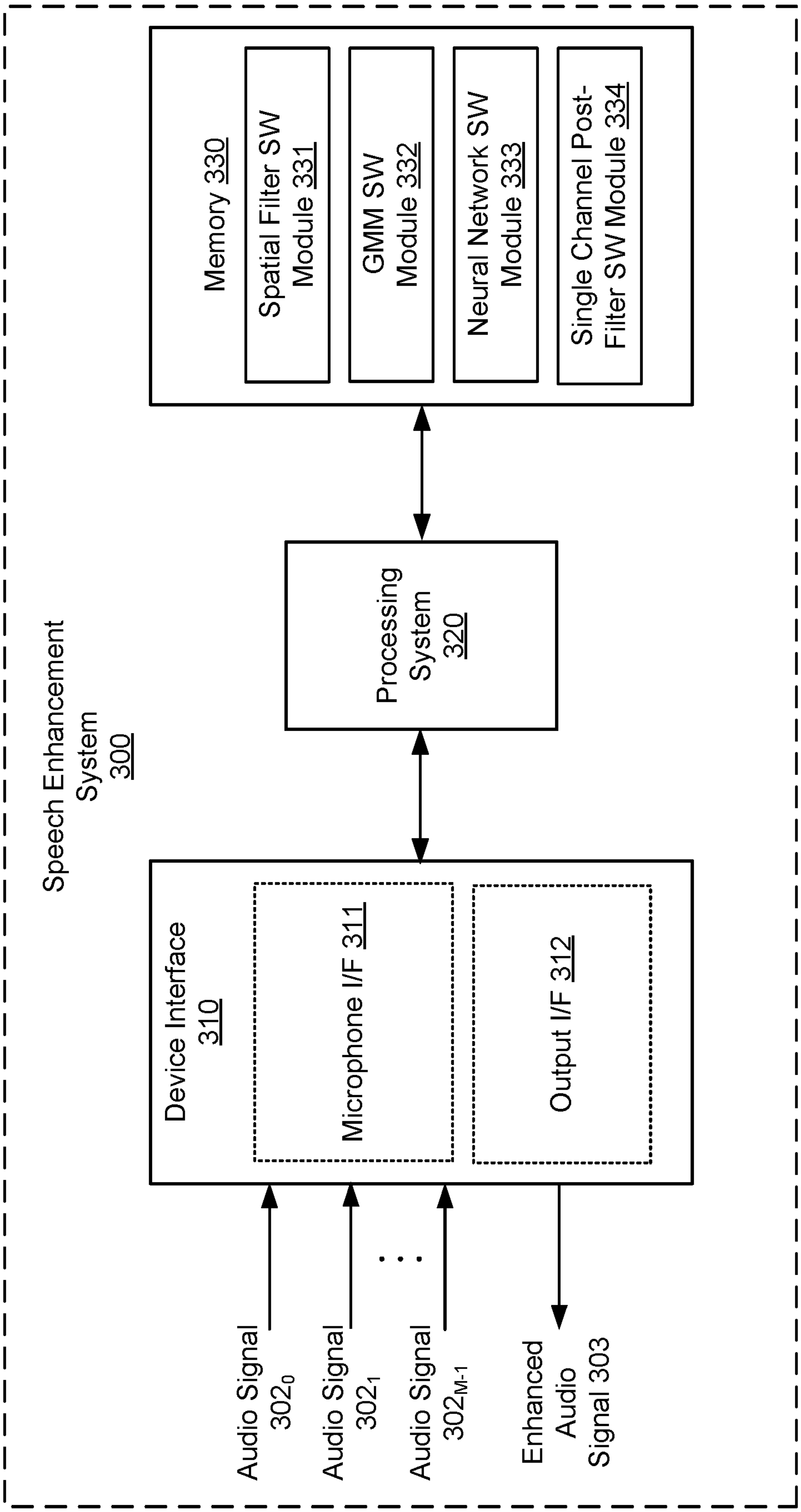
FIG. 3 shows a block diagram of an example speech enhancement system, according to some embodiments.

FIG. 3 shows a block diagram of an example speech enhancement system 300, according to some embodiments. The speech enhancement system 300 may be one example of the speech enhancement system 200 of FIG. 2. In some embodiments, the speech enhancement system 300 may be configured to filter audio signals $\mathbf{302}_0$, $\mathbf{302}_1$, . . . , $\mathbf{302}_{M-1}$ (also referred to, collectively, as a "multi-channel audio signal 302") to generate a corresponding enhanced audio signal 303. M represents the total number of microphones (or other acoustic sensors) used to capture the audio signals $\mathbf{302}_0$, $\mathbf{302}_1$, . . . , $\mathbf{302}_{M-1}$. The audio signals $\mathbf{302}_0$, $\mathbf{302}_1$, . . . , $\mathbf{302}_{M-1}$ may be an embodiment of the digital audio capture data 102 of FIG. 1 and/or the multi-channel audio signal $x_0(l,f)$–$x_{M-1}(l,f)$ of FIG. 2. Further, each audio signal 302 may be represented by a sequence of audio frames, and include speech from a speech source and noise from a noise source. In some embodiments, the audio signal $\mathbf{302}_1$ may be a reference audio channel (e.g., an audio signal captured by a reference microphone). The enhanced audio signal 303 may be an embodiment of the enhanced audio data 103 and/or the enhanced audio signal $\hat{s}(l, f)$ of FIGS. 1 and 2, respectively, and may be represented by a sequence of audio frames. In some aspects, the enhanced audio signal 303 may include enhanced speech (or reduced noise) relative to the multi channel audio signal 302. As shown in FIG. 3, the speech enhancement system 300 may include a device interface (also referred to as an "I/F") 310, a processing system 320, and a memory 330. In some embodiments, the device I/F 310 may include a microphone I/F 311 configured to receive the audio signals $\mathbf{302}_0$, $\mathbf{302}_1$, . . . , $\mathbf{302}_{M-1}$ from a microphone array (or other acoustic sensors). The device I/F 310 may also include an output I/F 312 configured to output the enhanced audio signal 303.

The memory 330 may include a non-transitory computer-readable medium (including one or more nonvolatile memory elements, such as EPROM, EEPROM, Flash memory, a hard drive, and the like) that may store at least the following software (SW) modules:

- a spatial filter SW module 331 configured to (i) determine, based at least in part on a first frame of the multi-channel audio signal 302, a corresponding first frame of an initial speech signal, and (ii) determine, based on the first frame of the multi-channel audio signal 302 and a likelihood of speech for the first frame determined by the neural network SW module 333, (a) a corresponding first frame of a speech signal, (b) a corresponding first frame of a noise signal, and (c) a VAD value for a corresponding first frame;
- a GMM SW module 332 configured to determine, based on (i) the first frame of the speech signal, (ii) the first frame of the noise signal, (iii) the VAD value for the first frame determined by the spatial filter SW module 331, and (iv) a VAD value for the first frame determined by the neural network SW module 333, a likelihood of speech in a corresponding first frame;
- a neural network SW module 333 that includes a neural network model and is configured to (i) determine a likelihood of speech for the first frame of the initial speech signal and a VAD value for the first frame of the initial speech signal, based at least in part on the first frame of the initial speech signal, and (ii) determine a likelihood of speech in a second frame of the initial speech signal and a VAD value for the second frame of the initial speech signal, based at least in part on the likelihood of speech in the first frame (determined by the GMM SW module 332) and the second frame of the initial speech signal (determined by the spatial filter SW module 331); and
- a single channel post-filter SW module 334 configured to determine a first frame of the enhanced audio signal 303 based at least in part on (i) the likelihood of speech in the corresponding first frame determined by the GMM SW module 332, (ii) the corresponding first frame of the speech signal, (iii) the corresponding first frame of the noise signal, and (iv) the VAD value for the corresponding first frame determined by the spatial filter SW module 331 and/or the VAD value for the corresponding first frame of the initial speech signal determined by the neural network SW module 333.

Each software module includes instructions that, when executed by the processing system 320, cause the speech enhancement system 300 to perform the corresponding functions.

The processing system 320 may include any suitable one or more processors capable of executing scripts or instructions of one or more software programs stored in the speech enhancement system 300 (such as in memory 330). For example, the processing system 320 may execute the spatial filter SW module 331 to determine, based at least in part on a first frame of the multi-channel audio signal 302, a corresponding first frame of an initial speech signal. The processing system 320 may also execute the spatial filter SW module 331 to determine, based at least in part on the first frame of the multi-channel audio signal 302 and a likelihood of speech for the first frame determined by the neural network SW module 333, (a) a corresponding first frame of a speech signal, (b) a corresponding first frame of a noise signal, and (c) a VAD value for a corresponding first frame. Further, the processing system 320 may execute the spatial filter SW module 331 to determine, based at least in part on a second frame of the multi-channel audio signal 302, a corresponding second frame of the initial speech signal.

The processing system 320 may also execute the GMM SW module 332 to determine, based on (i) the first frame of the speech signal, (ii) the first frame of the noise signal, (iii) the VAD value for the first frame determined by the spatial filter SW module 331, and (iv) a VAD value for the first frame determined by the neural network SW module 333, a likelihood of speech in a corresponding first frame.

Further, the processing system 320 may execute the neural network SW module 333 to determine, using the neural network model, and based at least in part on the first frame of the initial speech signal, (i) a likelihood of speech for the first frame of the initial speech signal and (ii) a VAD value for the first frame of the initial speech signal. The processing system 320 may also execute the neural network SW module 333 to determine, using the neural network model, a likelihood of speech in the second frame of the initial speech signal and a VAD value for the second frame of the initial speech signal, based at least in part on (i) the likelihood of speech in the first frame determined by the GMM SW module 332 and (ii) the second frame of the initial speech signal.

The processing system 320 may also execute the single channel post-filter SW module 334 to determine a first frame of the enhanced audio signal 303 based at least in part on (i) the likelihood of speech in the corresponding first frame (determined by the GMM SW module 332), (ii) the corresponding first frame of the speech signal, (iii) the corresponding first frame of the noise signal, and (iv) the VAD value for the corresponding first frame (determined by the spatial filter SW module 331) and/or the VAD value for the corresponding first frame of the initial speech signal (determined by the neural network SW module 333).

Figure 4:
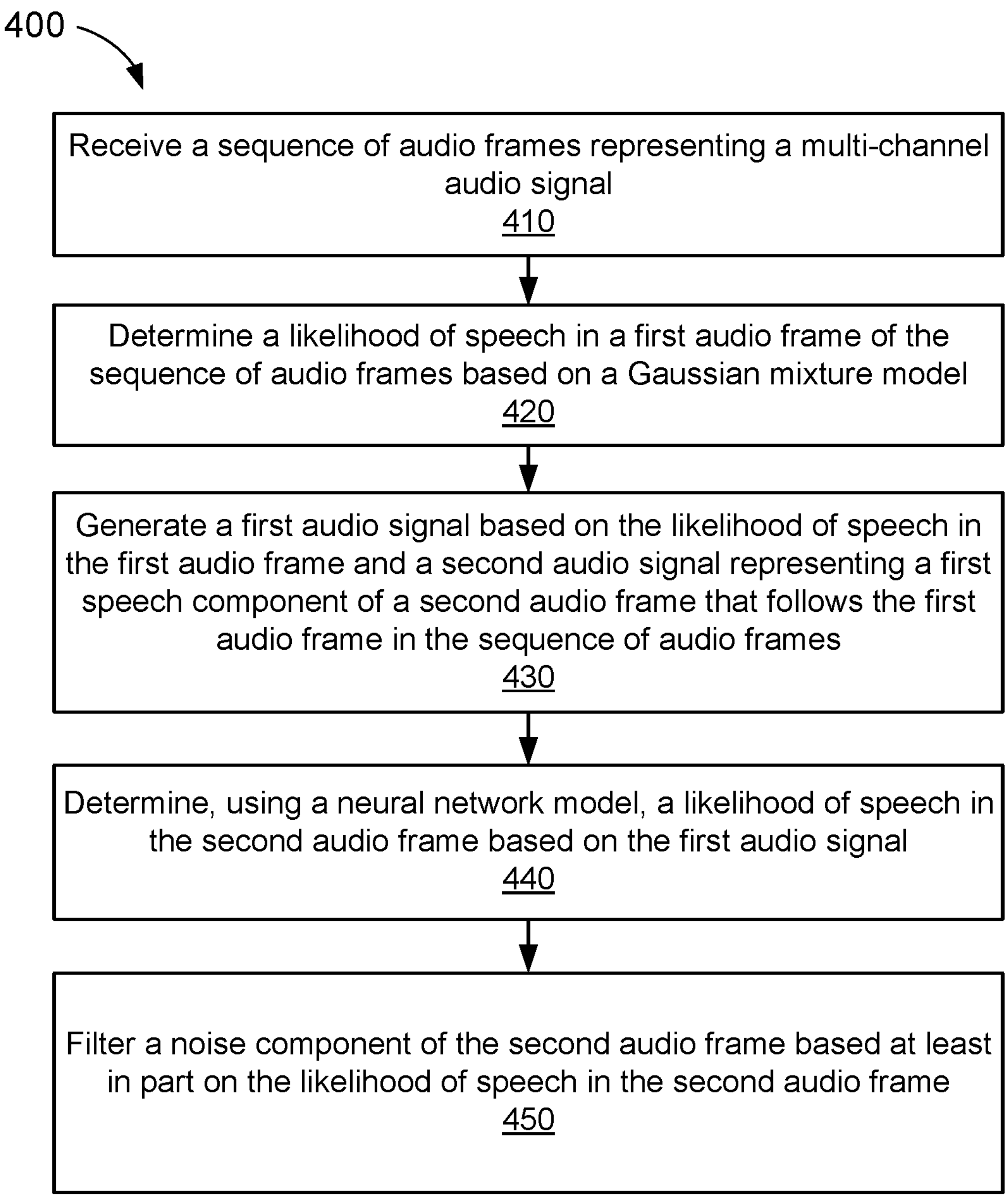
FIG. 4 shows an illustrative flowchart depicting an example operation for processing audio signals, according to some embodiments.

FIG. 4 shows an illustrative flowchart depicting an example operation 400 for processing audio signals, according to some embodiments. The example operation 400 may be performed by a speech enhancement system or signal processor (e.g., the signal processor 120 of FIG. 1 and/or the speech enhancement system 200 and/or 300 of FIGS. 2 and 3, respectively) to enhance speech (or suppress noise) in an audio signal that includes speech and noise. In some embodiments, the speech enhancement system (or signal processor) may include a spatial filter (e.g., a beamformer, an MVDR beamformer, or ICA), a GMM (e.g., an online GMM), a delay component (e.g., a buffer), a mixer, a neural network model (e.g. a DNN model), and single channel post-filter (e.g., Weiner filter).

As shown in FIG. 4, the speech enhancement system may receive a sequence of audio frames (e.g., at least first audio frame and a second audio frame) representing a multi-channel audio signal (e.g., $x_0(l, f)$–$x_{M-1}(l, f)$) (410). In some embodiments, each audio frame in the sequence of audio frames may include speech and noise. The multi-channel audio signal (e.g., $x_0(l, f)$–$x_{M-1}(l, f)$) may represent multiple audio signals captured by, for example, a microphone array. In some embodiments, the speech enhancement system may receive the sequence of audio frames based on the spatial filter.

In some embodiments, the speech enhancement system may also determine a likelihood of speech in (or derived from) the first audio frame of the sequence of audio frames (e.g., $p_{GMM}(l, f)$) based on the GMM (420). More specifically, the speech enhancement system may use the GMM to determine the likelihood of speech in the first audio frame (e.g., $p_{GMM}(l, f)$) based at least in part on (i) a first audio frame of a speech signal (e.g., $\tilde{s}(l, f)$), (ii) a first audio frame of a noise signal ($n(l, f)$), and (iii) one or more VAD values for the first audio frame (e.g., $VAD_{spatial}(l)$ and/or $VAD_{NN}(l)$). The GMM may represent a bimodal model with two Gaussian PDFs, where one of the Gaussian PDFs may be associated with speech dominance, and the other Gaussian PDF may be associated with noise dominance. In some embodiments, the delay component may receive the likelihood of speech in the first audio frame (e.g., $p_{GMM}(l, f)$) from the GMM, and store the likelihood of speech in the first audio frame. Further, the single channel post-filter may receive the likelihood of speech in the first audio frame (e.g., $p_{GMM}(l, f)$) from the GMM.

The speech enhancement system may further generate an enhanced audio signal (e.g., $z_{NN}(l+1, f)$) based on (i) the likelihood of speech in the first audio frame (e.g. $p_{GMM}(l, f)$) and (ii) an initial speech signal (e.g., $\tilde{s}_0(l+1, f)$) that represents a first speech component of the second audio frame (430). The second audio frame follows the first audio frame in the sequence of audio frames (430). In some embodiments, the speech enhancement system may use a mixer to receive (i) the likelihood of speech in the first audio frame (e.g. $p_{GMM}(l, f)$) from the delay component, and (ii) the initial speech signal (e.g., $\tilde{s}_0(l+1, f)$ from the spatial filter. The mixer may further combine the likelihood of speech in the first audio frame ($p_{GMM}(l, f)$) and the initial speech signal ($\tilde{s}_0(l+1, f)$) to generate the enhanced audio signal (e.g., $z_{NN}(l+1,f)$).

The speech enhancement system may also determine, using the neural network model, a likelihood of speech in (or derived from) the second audio frame in the sequence of audio frames (e.g., $p_{NN}(l+1, f)$) based on the enhanced audio signal (e.g., $z_{NN}(l+1, f)$) (440). Further, the speech enhancement system may use the neural network model to determine a VAD value for the second audio frame in the sequence of audio frames (e.g., $VAD_{NN}(l+1)$). That is, the neural network model may determine the VAD value for the second audio frame ($VAD_{NN}(l+1)$) based on (i) the likelihood of speech in the second audio frame (e.g., $p_{NN}(l+1, f)$) and (ii) the initial speech signal (e.g., $\tilde{s}_0(l+1, f)$). In some embodiments, the spatial filter may receive each of the likelihood of speech in the second audio frame (e.g., $p_{NN}(l+1, f)$) and the VAD value for the second audio frame (e.g., $VAD_{NN}(l+1)$) from the neural network model. Further, the GMM may receive the VAD value for the second audio frame (e.g., $VAD_{NN}(l+1)$) from the neural network model.

In some embodiments, the speech enhancement system may filter a noise component of the second audio frame in the sequence of audio frames (e.g., $n(l+1, f)$) (450). More specifically, the speech enhancement system may use the spatial filter to determine the noise component of the second audio frame (e.g., $n(l+1, f)$) based at least in part on the likelihood of speech in the second audio frame (e.g., $p_{NN}(l+1, f)$) (450).

Further, in some embodiments, the speech enhancement system may use the spatial filter to determine a VAD value for the second audio frame of the sequence of audio frames (e.g., $VAD_{spatial}(l+1)$). The spatial filter may determine the VAD value for the second audio frame (e.g., $VAD_{spatial}(l+1)$) based at least in part on (i) a second speech component of the second audio frame (e.g., $\tilde{s}(l+1, f)$), (ii) the noise component of the second audio frame (e.g., $n(l+1, f)$), and (iii) the VAD value for the second audio frame determined by the neural network model (e.g., $VAD_{NN}(l+1)$). In some embodiments, the GMM may receive, from the spatial filter, the VAD value for the second audio frame (e.g., $VAD_{spatial}(l+1)$), the second speech component of the second audio frame (e.g., $\tilde{s}(l+1, f)$), and the noise component of the second audio frame (e.g., $n(l+1, f)$). The GMM may also receive the VAD value for the second audio frame determined by the neural network model (e.g., $VAD_{NN}(l+1)$).

In some embodiments, the speech enhancement system may further determine, using the GMM, a set of parameters (e.g., $w_c(l+1, f)$, $\mu_c(l+1, f)$, and $\sigma_c(l+1, f)$) for the second audio frame. That is, the GMM may determine the set of parameters based on (i) the VAD value for the second audio frame determined by the spatial filter (e.g., $VAD_{spatial}(l+1)$), (ii) the VAD value for the second audio frame determined by the neural network model (e.g., $VAD_{NN}(l+1)$), (iii) the second speech component of the second audio frame (e.g., $\tilde{s}(l+1, f)$), and (iv) the noise component of the second audio frame (e.g., $n(l+1, f)$. Further, the GMM may determine a likelihood of speech in (or derived from) the second audio frame (e.g., $p_{GMM}(l+1, f)$) based on the set of parameters for the second audio frame.

In some embodiments, the speech enhancement system may determine, using the single channel post-filter, an enhanced speech (or audio) signal for (or derived from) the second audio frame (e.g., $\hat{s}(l+1, f)$). More specifically, the single-channel post-filter may determine the enhanced speech signal (e.g., $\hat{s}(l+1, f)$) based at least in part on the second speech component of the second audio frame (e.g., $\tilde{s}(l+1, f)$), and the likelihood of speech in the second audio frame determined by the GMM (e.g., $p_{GMM}(l+1,f)$).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of suppressing noise, comprising:

receiving a sequence of audio frames representing a multi-channel audio signal, the sequence of audio frames including at least a first audio frame (N) and a second audio frame (N+1) that immediately follows the first audio frame N in the sequence of a audio frames;

determining a likelihood of speech in the first audio frame N based on a Gaussian mixture model (GMM);

generating an initial audio signal based on a speech component of the second audio frame N+1;

generating an enhanced audio signal for the second audio frame N+1 based on the likelihood of speech in the first audio frame N and as the initial audio signal;

determining, using a neural network model, a likelihood of speech in the second audio frame N+1 based on the enhanced audio signal; and filtering a noise component of the second audio frame NI based at least in part on the likelihood of speech in the second audio frame N+1.

2. The method of claim 1, further comprising:

determining a first voice activity detection value based on the second initial audio signal and the likelihood of speech in the second audio frame N+1.

3. The method of claim 2, further comprising:

determining a second voice activity detection value based at least in part on a second speech component of the second audio frame N+1 and the noise component of the second audio frame N+1.

4. The method of claim 3, further comprising:

determining a set of parameters for the GMM based at least in part on the first and second voice activity detection values, wherein the likelihood of speech in the second audio frame N+1 is determined, using the GMM, based on the set of parameters.

5. The method of claim 4, further comprising:

generating a second enhanced audio signal based at least in part on the likelihood of speech in the second audio frame N+1 and the second speech component of the second audio frame N+1.

6. The method of claim 5, wherein the third-second enhanced audio signal is determined using a single channel post-filter.

7. The method of claim 6, wherein the single channel post-filter comprises a Wiener filter.

8. The method of claim 1, further comprising:

storing the likelihood of speech in the first audio frame N in a delay component prior to generating the enhanced audio signal.

9. The method of claim 1, wherein the noise component of the second audio frame N+1 is filtered using a spatial filter.

10. The method of claim 9, wherein the spatial filter comprises a minimum variance distortionless response beamformer or an independent component analysis.

11. The method of claim 1, wherein the neural network model comprises a deep neural network model.

12. The method of claim 1, wherein the GMM comprises an online GMM.

13. A system, comprising:

a processing system; and a memory storing instructions that, when executed by the processing system, cause the system to:

receive a sequence of audio frames representing a multi-channel audio signal, the sequence of audio frames including at least a first audio frame (N) and a second audio frame (N+1) that immediately follows the first audio frame N in the sequence of audio frames;

determine a likelihood of speech in the first audio frame N based on a Gaussian mixture model (GMM);

generate an initial audio signal based on a speech component of the second audio frame N+1;

generate an enhanced audio signal for the second audio frame N+1 based on the likelihood of speech in the first audio frame N and the initial audio signal;

determine, using a neural network model, a likelihood of speech in the second audio frame N+1 based on the enhanced audio signal; and filter a noise component of the second audio frame N+1 based at least in part on the likelihood of speech in the second audio frame N+1.

14. The system of claim 13, wherein execution of the instructions further causes the system to:

determine a first voice activity detection value based on the second-initial audio signal and the likelihood of speech in the second audio frame N+1.

15. The system of claim 14, wherein execution of the instructions further causes the system to:

determine a second voice activity detection value based at least in part on a second speech component of the second audio frame N+1 and the noise component of the second audio frame N+1.

16. The system of claim 15, wherein execution of the instructions further causes the system to:

determine a set of parameters for the GMM based at least in part on the first and second voice activity detection values, wherein the likelihood of speech in the second audio frame N+1 is determined, using the GMM, based on the set of parameters.

17. The system of claim 16, wherein execution of the instructions further causes the system to:

generate a second enhanced audio signal based at least in part on the likelihood of speech in the second audio frame N+1 and the second speech component of the second audio frame N+1.

18. The system of claim 17, wherein the second enhanced audio signal is determined using a single channel post-filter.

19. The system of claim 18, wherein the single channel post-filter comprises a Wiener filter.

20. The system of claim 13, wherein execution of the instructions further causes the system to:

store the likelihood of speech in the first audio frame N in a delay component prior to generating the enhanced audio signal.

* * * * *